United States Patent
Chesnutt et al.

(10) Patent No.: US 8,731,155 B2
(45) Date of Patent: May 20, 2014

(54) METHOD FOR REMOTELY CONTROLLING VEHICLE FEATURES

(75) Inventors: Elizabeth Chesnutt, Troy, MI (US); Michael J. Blanck, Clarkston, MI (US)

(73) Assignees: General Motors LLC, Detroit, MI (US); GM Global Technology Operations LLC, Detroit, MI (US)

( * ) Notice: Subject to any disclaimer, the term of this patent is extended or adjusted under 35 U.S.C. 154(b) by 1829 days.

(21) Appl. No.: 11/967,366

(22) Filed: Dec. 31, 2007

(65) Prior Publication Data

US 2009/0167524 A1 Jul. 2, 2009

(51) Int. Cl.
*H04M 11/00* (2006.01)

(52) U.S. Cl.
USPC ............ 379/102.01; 379/207.02; 379/265.02; 379/167.07

(58) Field of Classification Search
USPC .................. 379/191, 207.02, 265.02, 102.01, 379/167.07, 106.01, 88.02; 340/539.11, 340/539.16, 539.17, 539.19
See application file for complete search history.

(56) References Cited

U.S. PATENT DOCUMENTS

| 6,807,484 | B2 * | 10/2004 | Inoue et al. | 701/454 |
| 2004/0203634 | A1 * | 10/2004 | Wang et al. | 455/414.1 |
| 2004/0257208 | A1 * | 12/2004 | Huang et al. | 340/426.1 |

* cited by examiner

*Primary Examiner* — Duc Nguyen
*Assistant Examiner* — Yosef K Laekemariam
(74) *Attorney, Agent, or Firm* — Anthony Luke Simon; Reising Ethington P.C.

(57) ABSTRACT

A method and system that enables users to remotely control or manage certain vehicle features, such as emergency flashers or a remote engine start, through the use of a trigger device other than a conventional vehicle key fob. For example, a trigger device like a mobile phone, a personal digital assistant (PDA), or a computer can be used to remotely control or activate select vehicle features. In one embodiment, short message service (SMS) messages are used to send feature commands either directly from the trigger device to the vehicle or via a call center or other message processing entity.

21 Claims, 3 Drawing Sheets

METHOD FOR REMOTELY CONTROLLING VEHICLE FEATURES

TECHNICAL FIELD

The present invention generally relates to methods for controlling or activating vehicle features and, more particularly, to methods for remotely controlling vehicle features with commands wirelessly sent to the vehicle.

BACKGROUND OF THE INVENTION

Numerous types of wireless communication devices are used throughout the world each day, including devices such as mobile phones, pagers, personal digital assistants (PDAs), and vehicle communication devices. Many of these devices use one or more types of communication channels, including voice and data channels, to provide a variety of services over wireless networks. Some devices utilize data encoding techniques to communicate both voice and data information over a voice channel, while other devices must use a data channel to send data information.

Traditionally, vehicle key fobs employing remote keyless entry (RKE) technologies have been used to remotely control a limited number of vehicle features, such as power door locks and emergency flashers. Although RKE key fobs have been used extensively in the industry, there are certain drawbacks associated with their use. These include a somewhat restricted range of operation, a limited number of feature command options (usually only three or four options are available through a vehicle key fob), and others.

SUMMARY OF THE INVENTION

According to one aspect, there is provided a method for remotely controlling features of a vehicle. The method comprises the steps of: (a) sending a first command message from a trigger device to a call center, wherein the first command message includes a feature command and is created by a command application installed on the trigger device; (b) analyzing the first command message at the call center and determining if the trigger device is properly authorized to send command messages to the vehicle; (c) if the trigger device is properly authorized to send command messages to the vehicle, then wirelessly sending a second command message from the call center to the vehicle, wherein the second command message includes the feature command; and (d) executing the feature command at the vehicle in response to receiving the second command message.

According to another aspect, there is provided a method for remotely controlling features of a vehicle. The method comprises the steps of: (a) constructing a command message at a trigger device, wherein the command message is a short message service (SMS) message that includes a payload section; (b) wirelessly sending the SMS command message from the trigger device, wherein the payload section of the SMS command message includes a feature command for activating one or more features of the vehicle; (c) wirelessly receiving the SMS command message at the vehicle; and (d) extracting the feature command from the payload section of the SMS command message.

According to another aspect, there is provided a system for remotely controlling features of a vehicle that comprises a wireless carrier system, a trigger device, a call center, and a vehicle. The trigger device has a command application installed thereon, and the command application constructs a command message in response to a feature command selection made by a user. The call center is in communication with the trigger device and has records stored thereat, the records include information regarding the trigger device and the vehicle. The vehicle is in wireless communication with the call center and has a telematics unit and at least one vehicle feature, wherein the feature command selection made by the user causes: i) the trigger device to send the command message to the call center, ii) the call center to authenticate the command message with the records, iii) the call center to forward the authenticated command message to the vehicle over the wireless carrier system, iv) the vehicle to authenticate the forwarded command message, and v) the vehicle to execute the feature command selected by the user.

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE PREFERRED EMBODIMENTS

The remote control method described herein enables users to remotely control or manage certain vehicle features, such as emergency flashers or a remote engine start, through the use of a trigger device other than a conventional vehicle key fob. For example, a trigger device like a mobile phone, a personal digital assistant (PDA), or a computer can be used to remotely control or activate select vehicle features. The remote control method can expand the distance or range of operation for remote command, offer a wider array of optional commands, provide an automated authentication process so that human intervention is not required, and embellish the customer experience through the use of a new command medium, to name but a few of the potential advantages that the remote control method has over traditional command methods.

Communications System

Figure 1:
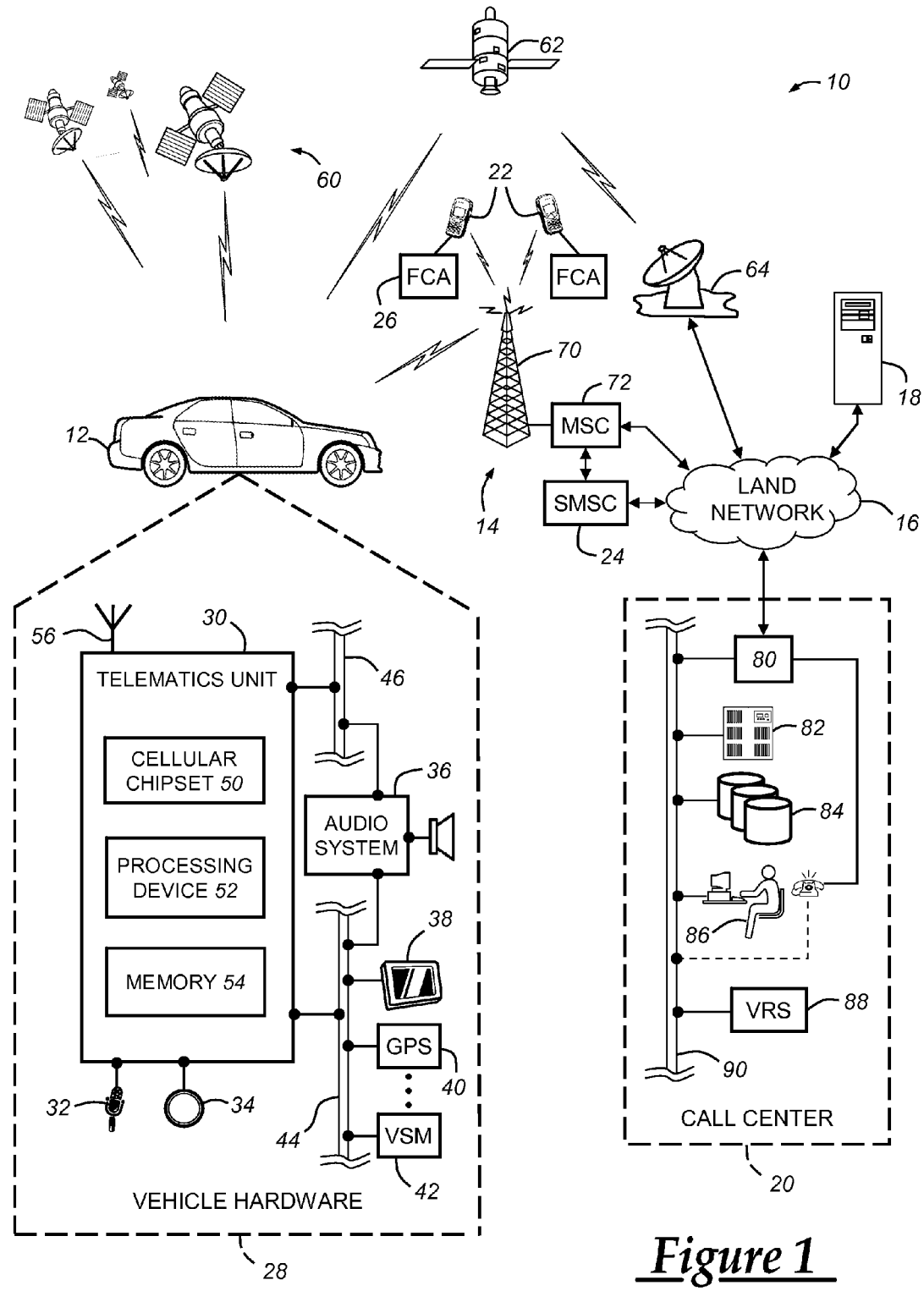
FIG. 1 is a block diagram depicting an exemplary embodiment of a communications system that is capable of utilizing the remote control method disclosed herein.

With reference to FIG. 1, there is shown an exemplary operating environment that comprises a mobile vehicle communications system 10 and that can be used to implement the remote control method disclosed herein. Communications system 10 generally includes a vehicle 12, one or more wireless carrier systems 14, a land communications network 16, a computer 18, a call center 20, and one or more trigger devices 22. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 are shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 is an OEM-installed device that enables wireless voice and/or data communication over wireless carrier system 14 and via wireless networking so that the vehicle can communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the communications channel. By providing both voice and data communication, telematics unit 30 enables the vehicle to offer a number of different services including those related to remote command, messaging, navigation, telephony, emergency assistance, diagnostics, infotainment, etc. Data can be sent over a data connection, such as via packet data transmission over a data channel, or via a voice channel using techniques known in the art. For combined services that involve both voice communication (e.g., with a live advisor or voice response unit at the call center 20) and data communication (e.g., to enable remote control of certain features), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switch data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the remote control method discussed herein.

Telematics unit 30 can be used to provide a diverse range of vehicle services that involve wireless communication to and/or from the vehicle. Such services can include: remote control of certain vehicle features; turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the exemplary telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests and perform other functions. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and emergency flashers. According to one embodiment, the ECM is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel, a pop-up visual display, or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Wireless carrier system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or for setting up or configuring subscriber preferences or remotely controlling certain vehicle features; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Trigger devices 22 include any device that can be used to remotely control one or more features of vehicle 12 by sending electronic commands through messages, such as SMS messages, instant messages, and/or emails, for instance. This includes devices that conduct manual and/or automated messaging operations, and those that connect to vehicle 12 through wireless carrier system 14, some other wireless networking system, and/or land network 16. Some examples of suitable trigger devices include mobile phones, personal digital assistants (PDAs), computers, and other telematics-equipped vehicles. According to the embodiment shown here, trigger devices like mobile phones and wireless-enabled PDAs directly access wireless carrier system 14 when communicating with vehicle 12, while other trigger devices access the wireless carrier system by going through the land network. Each trigger device 22 that is used within the system can have a command application (FCA) 26 installed on the device, as will be described below in greater detail.

Short message service center (SMSC) 24 is preferably in communication with wireless carrier system 14 and/or land network 16 and is involved in the communication of SMS messages. SMSC 24 can operate according to a store-and-forward principal; that is, when a first user sends an SMS message that is intended for a second user, the SMS message gets stored at the SMSC until the second user is available to receive it. In other embodiments, the SMSC employs a store-and-forget approach where it only attempts to pass the SMS message along one time. These types of approaches enable users to send and receive SMS messages at any time, even if they are currently on a voice call. It should of course be appreciated that the exemplary representation of SMSC 24 is but one example of a suitable arrangement, as the SMSC could instead be provided according to some other configuration known in the art. For instance, SMSC 24 could be integrated within wireless carrier system 14 and/or land network 16, instead of being schematically shown as a separate stand-alone component. Also, it is to be understood that multiple SMSCs may be utilized.

Remote Control Method

Figure 2:
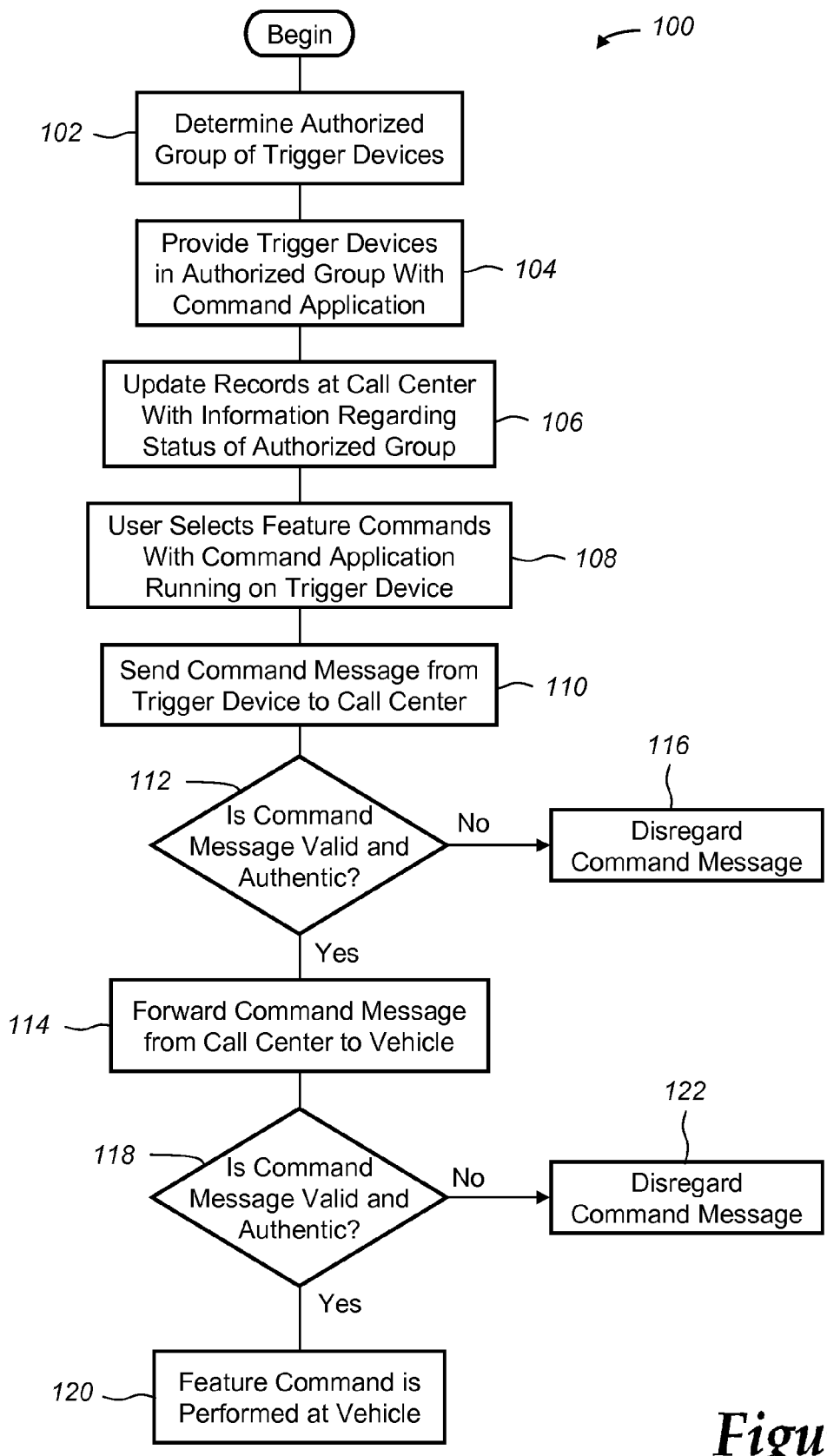
FIG. 2 is a flowchart illustrating some of the steps of an exemplary embodiment of the remote control method.

The remote control method described herein enables users to remotely control or activate certain vehicle features, such as emergency flashers or remote engine start, through the use of a trigger device 22 that communicates with vehicle 12. Turning now to FIG. 2, there is shown a flowchart that illustrates some of the steps of an exemplary embodiment 100 of such a method. According to this embodiment, step 102 determines or identifies an "authorized group," which includes one or more trigger devices 22 that have been granted access to activate or otherwise control certain features of a particular vehicle 12. The authorized group can be determined according to a variety of techniques. For example, any mobile phones, PDAs, computers, or other trigger devices 22 that are associated with the vehicle owner or account subscriber could automatically be added to the authorized group. In a different embodiment, the vehicle owner, account subscriber, or some other user specifically designates the trigger devices 22 to which they wish to grant remote commanding capabilities. They could do this by using computer 18 to enter one or more contact numbers for each of the selected trigger devices into an affiliated website, by providing the contact numbers to call center 20, or by inputting the contact numbers into the vehicle hardware 28 for subsequent transmission to the call center, to name but a few examples. Once step 102 is performed, the remote control method should be aware of which trigger devices 22 are authorized to remotely control features of vehicle 12 over a wireless network, such as wireless carrier system 14.

In step 104, each of the trigger devices 22 in the authorized group is provided with a feature command application 26, which is generally a software program that is designed to run on the trigger device and facilitate the activation or control of certain vehicle features. In the example where trigger device 22 is a mobile phone, the command application can be developed with the assistance of application development tools and platforms such as the Binary Runtime Environment for Wireless (BREW), Java Micro Edition (Java-ME), Android, or others known to those skilled in the art. Other command applications, including ones built to run on PDAs, computers and trigger devices other than mobile phones, can also be employed. This step could have an optional feature that first checks to see if trigger device 22 is already equipped with the command application so that redundant downloads, etc. can be avoided. In addition to the wide variety of command applications that can be used, there are a number of potential methods for deploying or making available the application to the different trigger devices 22.

For instance, call center 20 can send out an invitation to each trigger device 22 in the authorized group to download the command application. The command application can be provided for direct download to trigger device 22 or for indirect download where it is first downloaded to a computer or some other device and subsequently transferred to the trigger device via a wired or wireless connection. Because of the sensitive nature of the command application, it is desirable to carefully control its distribution so that it is only installed on properly authorized trigger devices. Thus, the aforementioned embodiment could be designed to only download the command application to a trigger device that is docked or otherwise connected to a computer where a user is logged into an online-type account at a website that is affiliated with vehicle 12. Alternatively, the command application or certain components thereof can be attached to an email or other communication and sent to the trigger devices 22 in the authorized group. Again, the preceding techniques are not an exhaustive list, as other methods and techniques for distributing or providing the command application to trigger devices 22 could also be used. It is also possible for step 104 to utilize different deployment methods for different members of the authorized group; for example, sending a download invitation to a first member of the authorized group and emailing the command application to a second member. Following installation of the command application, trigger device 22 is paired with vehicle 12 and may optionally send a registration notice or some other confirmation back to call center 20.

In step 106, call center 20 updates internal records maintained in files, databases, and other electronic data structures with current information regarding the status of the authorized group. For example, if three different trigger devices 22 (e.g.—the vehicle owner's mobile phone, PDA, and laptop computer) are selected to be part of the authorized group and two of the three devices download the command application, then call center 20 may record this information in a profile or other record stored in call center database 84. This information can be integrated into a larger profile for vehicle 12 or it can be maintained as a separate data component, to cite but two examples. It should be pointed out that step 106 does not have to be performed sequentially and separately, with respect to steps 102 and 104, as call center 20 could update its records when the authorized group is first determined, when the command application is provided to trigger devices 22, or at some other time. At this point, the remote control method is ready to process an outgoing command sent from one of the trigger devices.

Next, the user initiates or begins running the command program on trigger device 22 and selects one or more feature commands for vehicle 12, step 108. For instance, the command application can include a user interface to present the user with a drop-down menu, a command entry box, or some other graphical, textual or audible listing of features available for the particular vehicle in question. In the example of a mobile phone or PDA, an easy-to-use drop-down menu can be presented on the trigger device's screen so that the user can use a scroll wheel or other input device to toggle through the different feature command options. Different vehicles have different features, thus step 108 may need to inquire into the features available on vehicle 12. In order to do this, the command application may access feature information stored at trigger device 22 (this information could have been obtained during the pairing process mentioned above or during step 104, for example), it may send a request to call center 20 and/or vehicle 12 for an updated feature list for vehicle 12, or it may perform some other inquiry to determine the features on vehicle 12. Examples of vehicle features that can be remotely controlled with the present method include: remote engine starters, emergency flashers, various internal and external lights, horns, power door and trunk locks, power sliding doors, power tailgates and rear hatches, power folding seats, vehicle diagnostic resources, and telematics units (e.g., user can determine the number of minutes left on a particular vehicle calling plan, can purchase additional minutes, etc.). Again, the preceding examples are not an exhaustive list of all of the possible vehicle features that can be remotely controlled with the remote control method described herein, as other vehicle features could be controlled as well.

Once the user selects a particular feature command, the command application creates and sends a command message, step 110. In one embodiment, the command message is first sent from trigger device 22 to call center 20 or some other message processing destination, before a subsequent command message is sent from the call center to the vehicle. One of a number of different types of command messages can be sent in step 110, including those embodied in SMS messages, instant messages, emails, etc. and those sent over wireless carrier system 14, land network 16, or some other wired or wireless network. If an SMS message is used, the feature command can be included within a payload section of the SMS message, as is understood by those skilled in the art. By routing the command messages to call center 20 or some other pre-selected designation before sending them to vehicle 12, method 100 is able to perform a variety of security functions that can prevent or reduce the effects of unauthorized third party messages. Also, it can be helpful, from a security perspective, having call center 20 act as the only messaging gateway to vehicle 12. According to another embodiment, the command messages are sent directly from trigger device 22 to vehicle 12 via wireless carrier system 14 or some other wireless network.

According to an optional feature, the command application could check to see which type of messaging format is most efficient and/or economical before sending the command message in step 110. For example, if trigger device 22 is enrolled in a calling plan with unlimited SMS messages, then the command application could embody the feature commands in an SMS message to call center 20. The same applies to emails and other information sent according to packet-switched formats. Similarly, the command application could check the status of various network resources before sending messages in step 110. If there was a problem with SMSC 24, for example, then a command message initially composed as an SMS message could automatically be converted into an email or some other message type. It is also possible to send more than one message type in the event that a first command message fails to successfully reach call center 20. For instance, if a first command message is sent as an SMS message but does not reach the call center, then a second command signal could be sent as an email or other message type; various techniques could be used to determine if and when the messages reach the call center. These are only some of the possibilities, as the command application can certainly consider other factors when determining which type of message should be sent in step 110.

Once the command message arrives at call center 20, step 112 performs a variety of security-related functions in order to ensure the authenticity of the message. In one embodiment, step 112 checks records that are maintained at call center 20 and are associated with vehicle 12 to determine if the trigger device that sent the command message is properly authorized to send such messages to that particular vehicle. In other words, is trigger device 22 part of the authorized group for vehicle 12. This type of check can be performed by comparing the contact numbers saved in the records against the contact number of the trigger device sending the command message, or it can be performed according to other, more sophisticated techniques known in the art. To facilitate the process, the command application can include contact numbers and other pertinent pieces of data in a header or other section of the command message for easy extraction and analysis by call center 20.

In addition to determining whether or not trigger device 22 is part of the authorized group, call center 20 can employ a variety of other security-related functions before forwarding the command message to vehicle 12. For instance, call center 20 can encrypt the contents of the command message and then send them as unreadable cipher text to vehicle 12; thus, making it more difficult for a third party to intercept and interpret the message. A secret key, which is preferably saved at call center 20 and vehicle 12, is used to decrypt the command message at the vehicle. Examples of encryption techniques that could be used are disclosed in U.S. patent application Ser. No. 11/837,775 entitled Method of Authenticating a Short Message Service (SMS) message, which is assigned to the present assignee and is incorporated herein by reference. In one of the embodiments of that application, a hash function and secret key are used to produce a digest that is included in a payload section of an SMS message, which is then decrypted and authenticated at the vehicle. The aforementioned exemplary encryption techniques are directed to SMS messages, however, encryption and other security-related functions could be employed for non-SMS messages as well.

If step 112 determines that the command message is valid and authentic, then step 114 forwards the message from call center 20 to vehicle 12 via wireless carrier system 14 or some other wireless network. The command message wirelessly sent from call center 20 can be configured as one of a number of different message types including, but not limited to, SMS messages, instant messages, emails, circuit-switched messages sent by in-band modems (non-packet data messages sent over a voice channel), and packet data messages sent by modems like that described above in connection with telematics unit 30, to name but a few examples. In one embodiment, step 114 converts the message that was sent from trigger device 22 into a different message type before forwarding it to vehicle 12. For example, trigger device 22 could transmit an SMS message to call center 20, and the SMS message could be converted into an email or other message of packet-switched format before sending it to vehicle 12. Of course, the command message sent from trigger device 22 could simply be forwarded on to vehicle 12 with little or no modification to the message. Thus, "forwarding" broadly includes sending the command message to the vehicle unchanged, adding content such as encryption and other security features to the command message before sending it to the vehicle, removing content from the command message before sending it to the vehicle, changing the message type of the command message before sending it to the vehicle, or processing the command message from trigger device 22 according to some other method known in the art, so long as the feature command contained within the first command message is represented in the second command message; even if it is not represented in precisely the same form.

If, on the other hand, step 112 determines that the command message is not fit for transmission to vehicle 12, then step 116 can simply disregard the command message, store it for subsequent analysis and reference, or send a response to the trigger device from which it came indicating that it won't be sent to the vehicle, to cite but a few examples. One instance where step 112 may elect to not forward the command message on to the vehicle is if the originating trigger device is not part of the authorized group for that vehicle.

In step 118, vehicle 12 receives the command message from call center 20 and performs one or more security checks to verify the message's authenticity. In one embodiment, software maintained at the vehicle is designed to simply accept any message originating from call center 20, as it knows that the call center only sends valid messages. If the command feature message from the call center was encrypted, as described above, then software maintained at vehicle 12 would utilize the same secret key to decrypt the contents of the message. The encryption/decryption precautions can be in addition to or in lieu of checking the origination address of the command message to ensure that it is in fact from call center 20. Those skilled in the art will appreciated that these are only some of the possible security steps and techniques that could be used to authenticate the incoming command message, as others are certainly possible.

If the command message is deemed to be authentic—e.g., sent from the call center and properly encrypted—then the vehicle feature command contained within the contents of the message is performed or otherwise initiated, step 120. In the example where a user has requested a remote engine start, telematics unit 30 sends an intra-vehicle message on communications bus 44 to the vehicle's ignition system to activate ignition. If, on the other hand, the user has attempted to engage the vehicle's emergency flashers, then telematics unit 30 sends a message to a body control module or other VSM 42 that is in control of the emergency flashers. Methods for sending intra-vehicle commands over various types of vehicle buses are known in the art and, thus, are not repeated here in detail. If step 118 determines that the command message from call center 20 was invalid or was not properly authenticated, then step 122 disregards the command message from the call center.

One optional feature that can be used in conjunction with the remote control method involves the use of location information, such as global positioning system (GPS) coordinates, to ensure that the trigger device and the vehicle are within a certain range of one another before performing the feature command at the vehicle. According to this option, trigger device 22 is equipped with some type of location determination equipment—e.g., GPS receiver, cellular triangulation features, etc.—so that it can transmit trigger device location information with the command message in step 110. Trigger device location information broadly includes any type of data—whether it be coordinate data or otherwise—that is representative of the location of the trigger device. This trigger device location information is forwarded to the vehicle in step 114, where it is compared to vehicle location information that is representative of the location of vehicle 12. If trigger device 22 is located within a predetermined proximity of vehicle 12, then the accompanying feature command is executed or performed at the vehicle. If they are not within the predetermined proximity, then the feature command is ignored. By taking this additional precaution, remote control method 100 can avoid some situations where, for example, a user who is located several hundred miles away from their vehicle attempts to activate, intentionally or unintentionally, a remote engine start. It should be appreciated that the predetermined proximity can be a single constant value, it can be a variable that changes with different circumstances, it can be specific to certain feature commands (e.g. remote engine start requires a one mile proximity, where door unlock requires a two mile proximity), or it can be based on the specific make and model of vehicle 12, to name but a few possibilities.

Figure 3:
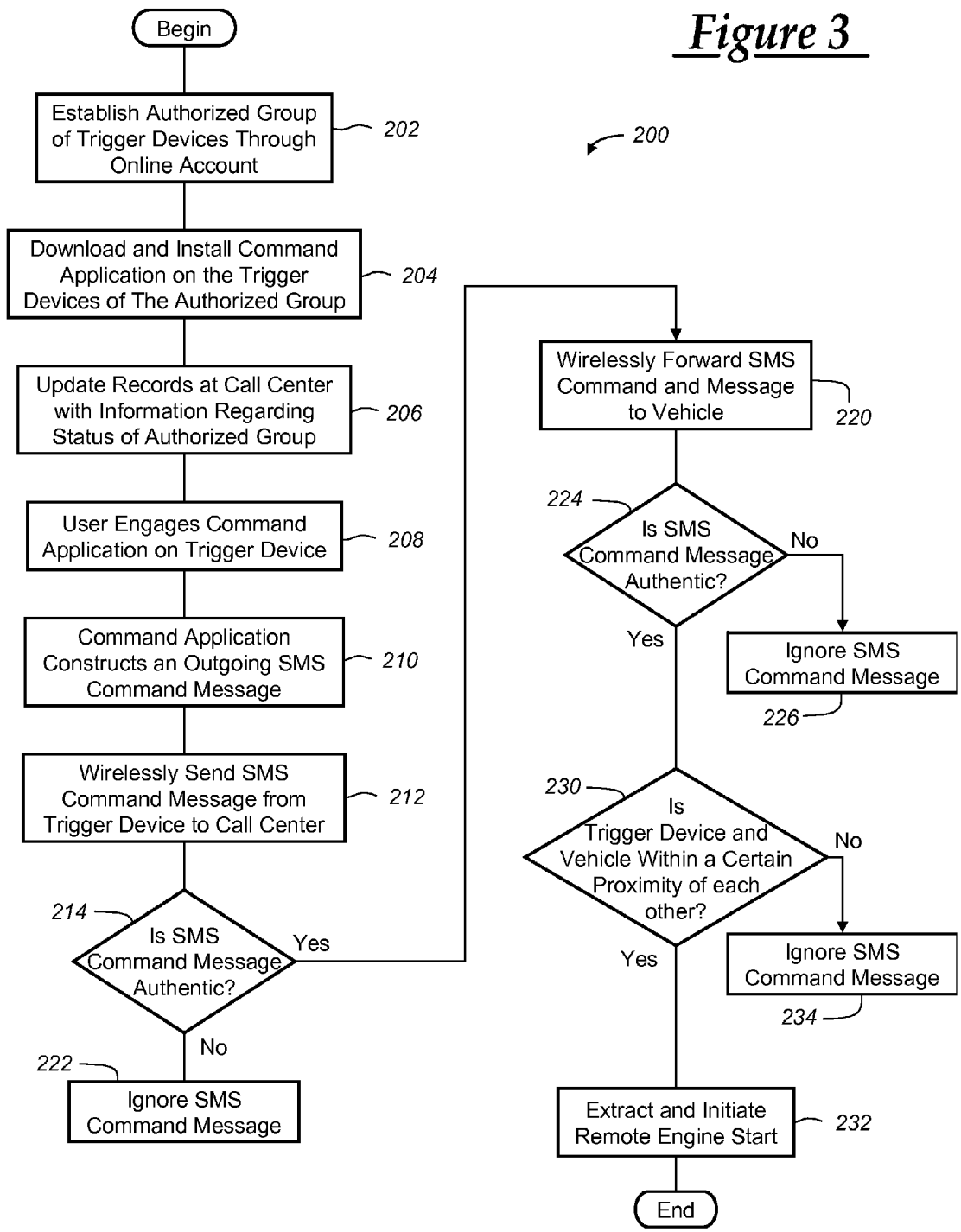
FIG. 3 is a flowchart illustrating some of the steps of a particular implementation of the remote control method shown in FIG. 2.

With reference to FIG. 3, there is shown a specific, exemplary embodiment 200 of the remote control method. Beginning with step 202, a user establishes an authorized group of trigger devices through an online account at an affiliated website. The user can log in to an online account by providing some type of security password, etc., and once logged in can designate one or more trigger devices to which they wish to grant remote feature control access. In this particular embodiment, the user selects a mobile phone 22 for its authorized trigger device by entering one or more contact numbers for the mobile phone; a process sometimes referred to as pairing. It should be appreciated that multiple trigger devices and trigger devices other than mobile phones can be selected. Examples of suitable contact numbers include electronic serial numbers (ESNs), mobile equipment identifiers (MEIDs), media access control addresses (MAC addresses), mobile identification numbers (MINs), mobile directory numbers (MDNs), Internet protocol addresses (IP addresses), subscriber account numbers and/or names, etc.

While the user is still logged into their online account, a command application is downloaded to their computing device and, if necessary, is transferred and installed on their designated trigger device, step 204. In the example above, if the user is using mobile phone 22 to access their online account, then the command application is simply downloaded and installed on the mobile phone. If they are logged into their account with a laptop computer, then mobile phone 22 would need to be connected to the computer so that the downloaded command application can be subsequently transferred and installed on the mobile phone. Once the authorized group has been established and the command application has been deployed to the trigger devices selected by the user, electronic records maintained at call center 20 are updated to reflect the most current status of the authorized group, step 206, as described above in more detail. With the command application installed on the designated trigger device and the call center records updated, the system is generally ready to accept remote feature commands from the user.

In step 208, the user engages or begins running the command application installed on the mobile phone. Once running, the command application uses the mobile phone's liquid crystal display (LCD) or other graphic display to present a menu of vehicle features that are available for remote control. In some cases, the command application could first send a query to vehicle 12 or call center 20 to get an updated list of available vehicle features, in other instances, that information will be stored at trigger device 22, as described above. Once the user identifies the vehicle feature that they wish to remotely activate, they interact with the user interface of the command application to make their selection. In the case where the user wishes to remotely start their vehicle with their mobile phone, the user makes this selection and the command application constructs a corresponding command message, step 210.

According to this particular embodiment, the command application requests trigger device location information from the mobile phone before sending out the command message. In this example, mobile phone 22 is equipped with a GPS receiver, so that GPS information representative of the current location of the mobile phone is packaged and included with the outgoing command message. According to this embodiment, the outgoing command message is an SMS message. The remote engine start feature command, as well as the trigger device GPS information, is inserted into a payload section of the SMS command message. Those skilled in the art will appreciate that a number of different techniques can be used for constructing the precise contents of the payload section, any of which can be utilized here. Once the SMS command message is fully constructed, it is wirelessly sent to call center 20 over wireless carrier system 14, step 212.

At the call center, the SMS command message is authenticated by one or more security-related functions, step 214, as described above. These security-related functions can include checking the origination address of the device that sent the SMS command message; i.e., mobile phone 22. It is also possible for the SMS command message from the trigger device to be encrypted; in which case, call center 20 will decrypt the incoming message according to one or more cryptographic methods known in the art. If call center 20 determines that the incoming SMS command message is from an authorized sender and has not been tampered with, then it can wirelessly forward the SMS command message to vehicle 12 over wireless carrier system 14, step 220. By sending the command message as an SMS message, as opposed to a packet-switched message, the present method can enjoy certain advantages such as increased speed, lower airtime costs, etc. On the other hand, packet-switched communications typically enjoy higher security and reliability than SMS messages; thus, some tradeoffs do exist between the different messaging types and they should be selected based on the particular needs of the application. If call center 20 determines that the SMS command message is unfit to forward along to vehicle 12, then the message can be ignored, quarantined, stored for analysis, etc., step 222.

Once the SMS command message is received at vehicle 12, the vehicle can perform one or more security-related functions to authenticate the incoming message, step 224, as described above. If the SMS command message is deemed to be authentic, then telematics unit 30 or some other electronic component of vehicle 12 can compare the trigger device GPS information that was embedded or inserted into the SMS command message with vehicle GPS information representative of the current or past location of the vehicle, step 230. If the GPS information shows that mobile phone 22 is within a certain proximity of vehicle 12, say for example one mile, then telematics unit 30 can extract and initiate the remote engine start command that was also included in the SMS command message, step 232. In this case, telematics unit 30 sends an intra-vehicle command signal to the vehicle's ignition system over vehicle bus 44, instructing it to start the vehicle. If, on the other hand, step 224 determines that the SMS command message is not authentic or if step 230 determines that the mobile phone and vehicle are not within a certain proximity of one another, then the SMS message can ignored, quarantined, stored for analysis, sent to the call center, etc. in steps 226, 234, respectively. Mobile phone 22 can continue to remotely control features of vehicle 12 until changes are made at the call center or vehicle to the mobile phone's authorized status. This process is sometimes referred to as unpairing.

It is to be understood that the foregoing description is not a definition of the invention, but is a description of one or more preferred exemplary embodiments of the invention. The invention is not limited to the particular embodiment(s) disclosed herein, but rather is defined solely by the claims below. For example, the particular steps and step sequence described above are for a preferred embodiment and other embodiments, including those having different step sequences, a different number of steps, or different steps, could also be used. For instance, it is not necessary for a command application to be installed on a trigger device in order to remotely control vehicle features, as a user logged into an online account could initiate command features directly through the web interface without downloading and installing the command application. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method for remotely controlling features of a vehicle, comprising the steps of:
    (a) sending a first command message from a trigger device to a call center, wherein the first command message includes a feature command and is created by a command application installed on the trigger device;
    (b) analyzing the first command message that includes the feature command at the call center and determining if the trigger device is properly authorized to send command messages to the vehicle;
(c) if the trigger device is properly authorized to send command messages to the vehicle, then wirelessly sending a second command message from the call center to the vehicle, wherein the second command message includes the feature command; and
(d) executing the feature command at the vehicle in response to receiving the second command message.

2. The remote control method of claim 1, further comprising the step of determining an authorized group before sending the first command message in step (a), wherein the authorized group is comprised of at least one trigger device that is designated by a user using an affiliated website.

3. The remote control method of claim 2, further comprising the step of updating records at the call center before sending the first command message in step (a), wherein the records at the call center are updated with information regarding the status of the authorized group and are used in step (b) in determining if the trigger device is properly authorized to send command messages to the vehicle.

4. The remote control method of claim 1, further comprising the step of presenting feature command options to a user before sending the first command message in step (a), wherein the feature command options are presented through an interface of the command application and are based on an inquiry into the available features of the vehicle.

5. The remote control method of claim 1, wherein the trigger device is a mobile phone and the command application is a software program designed to run on the mobile phone.

6. The remote control method of claim 1, wherein execution of the feature command in step (d) activates at least one feature that is located on the vehicle and is selected from the group consisting of: a remote engine starter, an emergency flasher, an internal light, an external light, a horn, a power door lock, a power trunk lock, a power sliding door, a power tailgate, a power rear hatch, a power folding seat, a vehicle diagnostic resource, or a telematics unit.

7. The remote control method of claim 1, wherein the first and second command messages are each a short message service (SMS) message having a payload section that includes the feature command.

8. The remote control method of claim 1, wherein step (c) further comprises encrypting contents of the second command message before wirelessly sending the second command message from the call center to the vehicle.

9. The remote control method of claim 1, further comprising the step of analyzing the second command message at the vehicle before executing the feature command in step (d), wherein the second command message is analyzed for authenticity by performing at least one of the following security-related functions: determining if the second command message is sent from the call center, or decrypting contents of the second command message with a secret key.

10. The remote control method of claim 1, further comprising the step of comparing trigger device location information with vehicle location information before executing the feature command in step (d), wherein the feature command is only executed if the trigger device and vehicle are within a predetermined proximity of one another.

11. A method for remotely controlling features of a vehicle, comprising the steps of:
(a) constructing a command message at a trigger device, wherein the command message is a short message service (SMS) message that includes a payload section including a feature command corresponding to a selected feature command for activating one or more features of the vehicle;
(b) wirelessly sending the SMS command message from the trigger device
(c) wirelessly receiving the SMS command message at the vehicle and analyzing the SMS command message for authenticity by determining if the SMS command message is received from a properly authorized sender; and
(d) if the SMS command message is received from a properly authorized sender, then extracting the feature command from the payload section of the SMS command message.

12. The remote control method of claim 11, further comprising the step of determining an authorized group before wirelessly sending the SMS command message in step (b), wherein the authorized group is comprised of at least one trigger device that is designated by a user using an affiliated website.

13. The remote control method of claim 12, further comprising the step of updating records at a call center before wirelessly sending the SMS command message in step (b), wherein the records at the call center are updated with information regarding the status of the authorized group and are used to determine if the trigger device is properly authorized to send command messages to the vehicle.

14. The remote control method of claim 11, further comprising the step of presenting feature command options to a user before constructing the SMS command message in step (a), wherein the feature command options are presented through an interface of a command application and are based on an inquiry into the available features of the vehicle.

15. The remote control method of claim 11, wherein the trigger device is a mobile phone having a command application installed thereon, the command application is a software program designed to run on the mobile phone.

16. The remote control method of claim 11, further comprising the step of activating a feature of the vehicle according to the feature command extracted in step (d), wherein the feature is selected from the group consisting of: a remote engine starter, an emergency flasher, an internal light, an external light, a horn, a power door lock, a power trunk lock, a power sliding door, a power tailgate, a power rear hatch, a power folding seat, a vehicle diagnostic resource, or a telematics unit.

17. The remote control method of claim 11, wherein step (b) further comprises wirelessly sending the SMS command message from the trigger device to a call center, and step (c) further comprises wirelessly receiving the SMS command message from the call center at the vehicle.

18. The remote control method of claim 11, wherein step (b) further comprises wirelessly sending the SMS command message directly from the trigger device to the vehicle, and step (c) further comprises wirelessly receiving the SMS command message directly from the trigger device at the vehicle.

19. The remote control method of claim 11, further comprising the step of decrypting contents of the SMS command message with a secret key.

20. The remote control method of claim 11, further comprising the step of comparing trigger device location information with vehicle location information, wherein the feature command extracted in step (d) is only executed if the trigger device and vehicle are within a predetermined proximity of one another.

21. A system for remotely controlling features of a vehicle, comprising:
a wireless carrier system;

a trigger device having a command application installed thereon, wherein the command application constructs a command message in response to a feature command selection made by a user, and further wherein the command message includes a feature command corresponding to the selected feature command;
a call center in communication with the trigger device and having records stored thereat, the records including information regarding the trigger device and the vehicle; and
a vehicle in wireless communication with the call center and having a telematics unit and at least one vehicle feature, wherein the feature command selection made by the user causes: i) the trigger device to send the command message to the call center, ii) the call center to authenticate the command message with the records to determine if the trigger device is properly authorized to send command messages to the vehicle, iii) the call center to forward the authenticated command message to the vehicle over the wireless carrier system if the trigger device is properly authorized to send command messages to the vehicle, iv) the vehicle to authenticate the forwarded command message, and v) the vehicle to execute the feature command selected by the user.

* * * * *